(12) United States Patent
Gross

(10) Patent No.: US 7,905,788 B2
(45) Date of Patent: Mar. 15, 2011

(54) AXIAL INSULATION FOR A UNIVERSAL CROSS JOINT

(75) Inventor: Norbert Gross, Duesseldorf (DE)

(73) Assignee: Ford Global Technologies, LLC, Dearborn, MI (US)

( * ) Notice: Subject to any disclaimer, the term of this patent is extended or adjusted under 35 U.S.C. 154(b) by 611 days.

(21) Appl. No.: 11/276,049

(22) Filed: Feb. 10, 2006

(65) Prior Publication Data

US 2006/0183559 A1    Aug. 17, 2006

(30) Foreign Application Priority Data

Feb. 11, 2005    (EP) .................................... 05100992

(51) Int. Cl.
*F16D 3/00*    (2006.01)
(52) U.S. Cl. ........................ 464/125; 464/119
(58) Field of Classification Search ............ 464/92, 464/87, 69, 125, 126, 51, 106, 112, 147, 464/185
See application file for complete search history.

(56) References Cited

U.S. PATENT DOCUMENTS

| | | | |
|---|---|---|---|
| 197,495 A | 11/1877 | Ralston | |
| 1,180,468 A | 4/1916 | Bartlett | |
| 1,456,068 A | 5/1923 | Lord | |
| 1,642,775 A | 9/1927 | Henry | |
| 1,694,064 A | 12/1928 | Jencick | |
| 1,702,363 A | 2/1929 | Peters | |
| 1,855,640 A | 4/1932 | Lord | |
| 2,024,777 A | 12/1935 | Neumann | |
| 2,537,847 A | 1/1951 | Neher | |
| 3,342,041 A | 9/1967 | Nebiker | |
| 4,121,437 A | 10/1978 | Michel | |
| 4,229,951 A | 10/1980 | Jedlicka | |
| 4,412,827 A | 11/1983 | Petrzelka et al. | |
| 4,850,933 A | 7/1989 | Osborn | |
| 5,267,904 A | 12/1993 | Geisthoff | |
| 5,551,919 A | 9/1996 | Cherpician | |
| 6,026,703 A * | 2/2000 | Stanisic et al. | 464/106 |
| 6,685,569 B2 | 2/2004 | Kurzeja et al. | |
| 6,893,350 B2 | 5/2005 | Menosky et al. | |

(Continued)

FOREIGN PATENT DOCUMENTS

DE    10001270    7/2001

(Continued)

OTHER PUBLICATIONS

Abstract for WO 01/51823 (Above).

(Continued)

*Primary Examiner* — Aaron Dunwoody
(74) *Attorney, Agent, or Firm* — O'Brien Jones, PLLC

(57) ABSTRACT

A universal joint comprising two joint yokes. One of the joint yokes is connected a driven shaft or drive shaft. The other joint yoke is connected to the other of the driven shaft or drive shaft. The two joint yokes are offset 90° in relation to each other to form an internal space. An elastic coupling element is associated with the universal joint. One of the joint yokes or its yoke arms is associated with a pin bearer. The other joint yoke or its yoke arm is associated with a holding element. Both the pin bearer and the holding element are pivoted in bearings respectively disposed in the joint yokes. The pin bearer and the holding element are spatially separated from one another and connected via the elastic coupling element.

12 Claims, 3 Drawing Sheets

U.S. PATENT DOCUMENTS

| | | |
|---|---|---|
| 6,923,726 B1 | 8/2005 | Lindenthal et al. |
| 2004/0152526 A1 | 8/2004 | Sekine |
| 2004/0224778 A1 | 11/2004 | Menosky et al. |

FOREIGN PATENT DOCUMENTS

| | | |
|---|---|---|
| EP | 0 160 599 A1 | 11/1985 |
| EP | 0160599 | 11/1985 |
| EP | 0160599 | 7/1988 |
| EP | 361745 A1 * | 4/1990 |
| EP | 0 563 940 B1 | 10/1993 |
| EP | 0563940 | 10/1993 |
| EP | 0563940 B1 | 9/1999 |
| EP | 0967411 | 12/1999 |
| FR | 2138424 | 1/1973 |
| FR | 2568329 | 1/1986 |
| GB | 492492 | 9/1938 |
| GB | 851174 | 10/1960 |
| GB | 942495 | 11/1963 |
| GB | 942495 | 11/1983 |
| SU | 606021 | 5/1978 |
| WO | WO 01/51823 | 7/2001 |

OTHER PUBLICATIONS

Abstract for FR 2568329 (Above).
Abstract for DE 10001270 (Above).
Abstract for EP 0160599 (Above).
International Search Report issued in corresponding foreign application, EP 05 10 0987, dated Jun. 7, 2005.
International Search Report issued in corresponding foreign application, EP 05 10 0999, dated Jun. 7, 2005.
International Search Report issued in corresponding foreign application, EP 05 10 0997, dated Jun. 7, 2005.
International Search Report issued in corresponding foreign application, EP 05 10 0994, dated Jun. 6, 2005.
International Search Report issued in corresponding foreign application, EP 05 10 0992, dated Jun. 20, 2005.

* cited by examiner

AXIAL INSULATION FOR A UNIVERSAL CROSS JOINT

The present invention is related to U.S. Pat. No. 7,445,555 entitled "Axial Insulation for a Universal Joint", U.S. Pat. No. 7,445,554 entitled "Insulation for Universal Cross Joint", U.S. Pat. No. 7,488,256 entitled "A Universal Cross Joint With Axial Insulation", and U.S. Pat. No. 7,517,283 entitled "A Cardanic Cross Joint With Insulation", each of which was filed simultaneously herewith.

FIELD OF THE INVENTION

The invention relates to a universal joint having two joint yokes, wherein one of the joint yokes is connectable or connected with a driven shaft or a drive shaft, and the other joint yoke is connectable or connected to a shaft to be driven or a drive shaft.

BACKGROUND OF THE INVENTION

Cardan or universal joints are usually used when two torque-transmitting shafts whose aligned orientation is not always ensured are to be connected with each other. The cardan joint then usually consists of two opposing joint yokes that are arranged twisted radially at an angle of 90° in relation to each other that each represents one end of the two shafts that are to be connected in an articulated manner. The cross member, which consists of two pin bearers offset against each other by 90°, is disposed between the joint yokes, the cross member being made of one piece so that the two pin bearers are rigidly connected with each other. The pin bearers are each supported, pivotally about their axes, in the two joint yokes.

With regard to the transmission of driving forces, the skilled person is regularly presented with the task of transmitting the rotational movement on the one hand, but, on the other, of eliminating vibrations and shocks if possible. Such interferences may, for example, be caused by vibrations from the drive unit. This problem is especially noticeable in automobile engineering, in particular in the area of the drive train, for example in the area of the cardan shaft where the vibrations between drive assembly and rear axle are transmitted without hindrance, and in the area of the steering line or in the steering column where, should conventional cardan joints be used, no insulation whatsoever is effected against low-frequency vibrations or shocks imposed by road bumps. Such interferences may, on the one hand, lead to damages in the drive train or the steering column and/or to adverse effects of an acoustic or mechanical nature for the driver.

For the purpose of uncoupling with regard to acoustics or vibration dynamics, in particular in the steering column, it is, for example, known to use a torsional elastic coupling with a so-called Hardy disk as an axially elastic coupling element or a loop disk. The Hardy disk is disposed, for example, in the steering column between the bottom cardan joint and a steering housing or steering gear or between the cardan joints. The Hardy disk, which is rigid in the direction of rotation, is formed such that it is soft in the direction of the steering column. As principle requires, the bending stiffness of the Hardy disk is relatively small. This causes a distortion of the Hardy disk with the bending moments from the cardan joint if the Hardy disk is arranged in series with the cardan joint, as is commonly the case. Since a Hardy disk alone (without a cardan joint), at least given appropriate life expectancies, is not suitable for connecting non-aligned shafts, the number of components is disadvantageously increased with the necessary arrangement in series with the cardan joint. Furthermore, the axial constructional space is increased thereby, and the usual compensation of the discontinuities by means of two cardanic joints arranged in anti-phase is disturbed by the additional Hardy disk since it works like an additional joint when placed in series.

The following is a discussion of relevant art pertaining to cardan joints. The discussion is provided only for understanding of the invention that follows. The summary is not an admission that any of the work described below is prior art to the claimed invention.

EP 0 563 940 B1 discloses a universal joint comprising two forks which are situated opposite one another with a 90° offset and which are each a part of each one of two shafts which are to be pivotally interconnected, or which are adapted each to be connected to each one of two shaft ends which are to be pivotally interconnected, and comprising two journal pairs which are offset by 90° from another and which form a journal cross and which are rotatable about their axis in the respective fork ends and, relative to the rotational axis of the shafts, are mounted for torque transmission, the two journal pairs being at least slightly pivotable relatively to one another in the plane formed by the journal cross, each journal being mounted in an anchor bracket and adjacent anchor brackets are interconnected by an elastic coupling element, whereby the elastic coupling element contains reinforcing inlays in loop form, which are disposed to be stationary and which each interconnect two adjacent anchor brackets and in that the reinforcing inlays in loop form are situated along the periphery of the universal joint in a loop plane which is perpendicular to the plane of the journal cross.

It must be regarded as a main disadvantage of the cross joint disclosed in EP 0 563 940 B1 that the two pairs of pins connect the own pins with each other integrally in different ways: The one pair uses a through bolt, the other pair is configured from two short pins that are connected with each other by means of an additional connecting portion. For this reason, a different production tool is required for the production of each pin or pair of pins, which makes the production of the cross joint extremely cost-intensive. The necessary connecting portion furthermore limits the axial and radial clearance of the joint. Furthermore, the need for axial constructional space can be optimized.

It is a further disadvantage that the cross joint disclosed in EP 0 563 940 B1 takes a lot of constructional effort and is thus very susceptible to malfunction. It must be considered a further disadvantage that the yokes must be designed small with regard to width and that thus, their yoke bearings must be designed to be bigger (more expensive) in order to transmit a sufficient torque given reasonable construction dimensions. If the flexible ring is damaged in the cross joint of EP 0 563 940 B1, a replacement ring must be supplied via the anchors. In addition, the cross joint is difficult to balance, especially in the case of shafts that rotate quickly.

EP 0 160 599 describes a flexible coupling device comprising first and second yokes which are intended to be fixed, respectively, to a drive member and a driven member, which each have arms arranged so that the arms of the first yoke are interposed with those of the second yoke, whereby to each yoke is fixed a support and these two supports are arranged opposite each other so that the facing surfaces of these supports are substantially perpendicular to the rotation axis of the device, in that an elastomeric linking element is fixed to these facing surfaces of the supports, and in that each support is fixed to the corresponding yoke by means of a spindle engaging in at least one opening in said support and in holec provided in the arms of said yoke.

GB 942,495 discloses a universal coupling for shafts comprising a flexible disc having coupling elements extending one on each side thereof, each for connection to one of the shafts to be coupled, the coupling elements being pivoted to the disc about axes at right angles and lying normally to the axis of the disc whereby, in use of the coupling, angular misalignment of the coupled shafts may be accommodated by pivoting of the coupling elements without flexure of the disc, the disc being composed wholly or mainly of plastic, rubber or the like resilient material which is unrestrained so as to be free to flex during use of the coupling.

It must be considered as a main disadvantage of the connection for shafts disclosed in GB 942,495 that the coupling elements are rotated with clearance towards the disk and with significant friction, the torsion clearance and the friction merely satisfying modest demands.

Therefore, what is needed is an improved universal joint of the type mentioned at the beginning with simple means in such a way that it is cheaper to produce from an economic standpoint, without the elastic coupling element having to convey significant bending moments.

SUMMARY OF THE INVENTION

This invention provides a universal joint for coupling a drive shaft and a driven shaft. The universal joint comprises two joint yokes, each having bearing elements at axially opposite yoke arms. One joint yoke is connected with the driven shaft and the other joint yoke being connected to the drive shaft. The two joint yokes are arranged radially at an angle of 90° in relation to each other to form an internal space. The universal joint additionally includes a holding element, respectively, pivoted in the bearings in one of the joint yoke axially opposite yoke arms. It also includes a pin bearer pivoted in the bearings of the other joint yoke. Furthermore, the universal joint includes an elastic coupling element wherein the holding element and the pin bearer are spatially separated from one another and are connected to each other via the elastic coupling element.

Advantageously, a hitherto commonly used elastic uncoupling member arranged in series (additional elastic coupling) can thus be done without in the universal joint according to the invention. The elastic coupling element is advantageously arranged parallel to the universal joint. Within the sense of the invention, a parallel arrangement means that the elastic coupling element is directly associated with the universal joint. The universal joint according to the invention has half a cross member, namely only a single pin bearer, as well as the holding element for receiving the elastic coupling element. Thus, the universal joint as a unit with the elastic coupling element integrated into the joint is easier and cheaper to produce. In addition, a universal joint is provided which satisfies high demands with regard to torsion clearance and to the bearing friction.

It is favorable within the sense of the invention if the pin bearer is disposed in the internal space, the holding element being guided around an outer side of the associated joint yoke or its yoke arms.

It may be expediently provided that the holding element has two opposite pins reaching into the associated bearings of the associated joint yoke.

It is favorable within the sense of the invention if the pins of the holding element, in relation to a middle axis of the joint, each reach into the associated yoke arms or the bearings disposed therein counter-directionally.

In a further preferred embodiment, it is favorable within the sense of the invention if the pins of the holding element with their free end reach into the yoke arms or into the bearings disposed therein in a direction oriented from the outer side of the yoke arms opposite to the internal space towards the internal space. In this case, the pins or the holding element are arranged on the outside in relation to the middle axis of the joint.

With regard to the connection of the elastic coupling element with the holding element, it is favorable within the sense of the invention if the holding element has a fastening area which, seen in a side view, is formed L-shaped with a pin section and a base web arranged thereon. The elastic coupling element is preferably connected with the base web.

It is expedient within the sense of the invention if the pin bearer is formed as a rotationally-symmetric body disposed in the internal space.

In a preferred embodiment, the pin bearer has a basic body and an adjacent L-shaped (seen in a side view) fastening area with a preferably rotationally-symmetric transversal web and a base web arranged thereon, the transversal web reaching through the bearings in a direction oriented from the internal space towards an outer side of the associated joint yoke or its yoke arms opposite the internal space. Seen in a side view, the transversal web can advantageously be formed slightly more narrowly than the basic body so that a bearing shoulder is formed in a transitional area from the basic body to the L-shaped fastening area. The pin bearer, with the bearing shoulder, abuts the side of the bearing oriented towards the internal space.

In a preferred embodiment, the pin bearer is formed in one piece with its basic body and the fastening area arranged thereon. However, the pin bearer may of course be formed in several pieces, the fastening area being connected with the basic body in a suitable manner. It is conceivable that the pin bearer is produced in two pieces, with a fastening area arranged at the end of the basic body as one piece, the other fastening area being connected with the basic body at its other end as a separate component. A production in three pieces is also possible with two separate fastening areas which are each connected with the basic body in a suitable manner.

The elastic coupling element is preferably connected with the base web of the pin bearer.

The elastic coupling element may, for example, consist of rubber or the like. Therefore, a screw joint, rivet joint, vulcanization or the like can, for example, be provided as the connection of the elastic coupling element with the holding element and the pin bearer or the respective base web. Furthermore, the elastic coupling element may also be advantageously guided around the outer sides of the joint yokes or their yoke arms as a torsion-resistant, flexural elastic or axially elastic ring, e.g. annulus, or multi-angular or polygonal ring.

In a preferred embodiment of the invention, it is expediently provided that the holding element associated with the one joint yoke is formed as a ring clamp, which, seen in a top view, is formed semi-circle-shaped.

It can be advantageously provided in a further preferred embodiment that the holding element associated with the one joint yoke is formed as a supporting ring or annulus.

The universal joint according to the invention is particularly suitable for use in in a steering column of a motor vehicle, wherein axial shocks can be filtered out as compared to a conventional universal joint. This behavior is especially desirable in structures of steering columns because thus, axial shocks, for example due to stimuli from the road, can be kept away from a steering wheel without having to make sacrifices with regard to torsional stiffness. By integration of the elasticity through the doubly pivotally supported elastic coupling element into or around the universal joint, it is avoided that a bending stiffness must also be provided, in addition to the axial compliance. By means of the universal joint according to the invention, the axial compliance can be made greater so that insulation properties are also improved over conventional elastic couplings in structures of steering columns. The integrated elastic coupling element does not have to convey significant bending moments because the elastic coupling element is kept free of bending by bearings in the axis of the moments. This makes ideal compliance properties in axial direction without bending resistances with optimal stiffness in the direction of rotation possible. The large axial compliance of the joint can favor omitting an otherwise commonly used slip joint from the steering column, which has to compensate fitting tolerances and stimuli from the road. In addition, the integration of the ring according to the invention permits a simple conveying of the flexible ring in axial direction. In addition, the universal joint according to the invention requires a minimum of axial constructional space.

The invention can further include one or more features being subject matter of the dependant claims. Modes for carrying out the present invention are explained below by reference to non limiting embodiments of the present invention shown in the attached drawings. The above-mentioned object, other objects, characteristics and advantages of the present invention will become apparent from the detailed description of the embodiment of the invention presented below in conjunction with the attached drawings.

BRIEF DESCRIPTION OF THE DRAWINGS

Further advantageous embodiments of the invention are disclosed in the dependent claims and the following description of the figures. In the figures:

In the different figures, the same parts are always provided with the same reference numeral so that they are also only described once, as a rule.

DETAILED DESCRIPTION OF THE INVENTION

Figure 1:
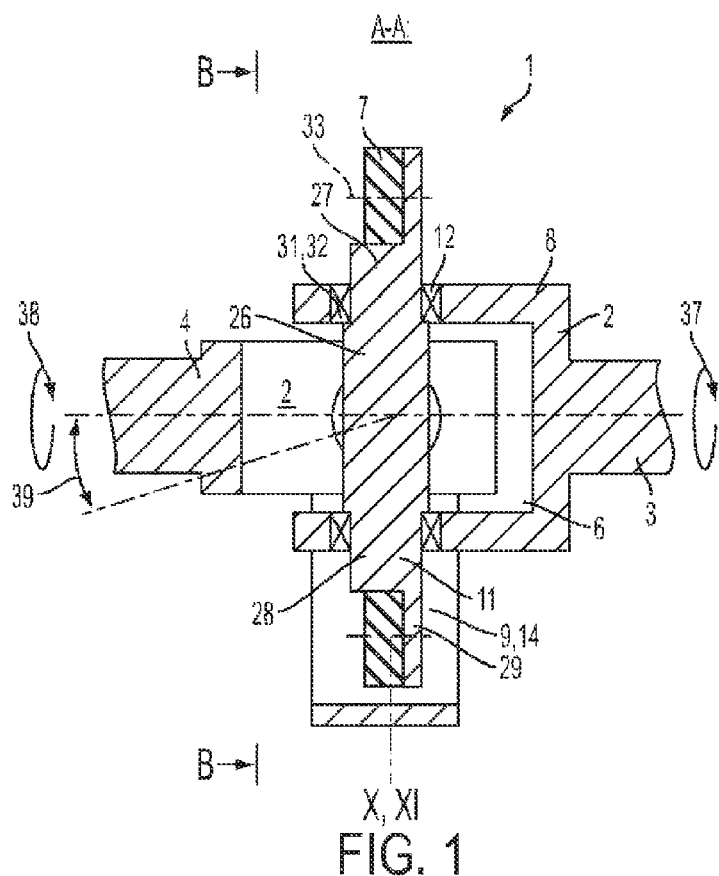
FIG. 1 shows a longitudinal section of a universal joint.

The FIGS. 1 to 5 show a universal joint 1 having two joint yokes 2. One of the joint yokes 2 is connected to a driven shaft 3 or drive shaft 3, the other joint yoke 2 being connected to the shaft 4 to be driven or driven shaft 4. The two joint yokes 2 are arranged twisted radially at an angle of 90° in relation to each other so that the two joint yokes 2 form an internal space 6. An elastic coupling element 7 is associated with the universal joint 1. One of the joint yokes 2 or its yoke arms 8 is associated with a holding element 9, the other joint yoke 2 or its yoke arms 8 being associated with a pin bearer 11. Both the pin bearer 11 as well as the holding element 9 are pivoted in bearings 12 disposed the joint yokes 2 or in their yoke arms 8. The pin bearer 11 and the holding element 9 are spatially separated from one another and connected via the elastic coupling element 7. The connections of the shaft 4 to be driven or drive shaft 4 and the driven shaft 3 or drive shaft 4 may of course also be reversed.

Figure 4:
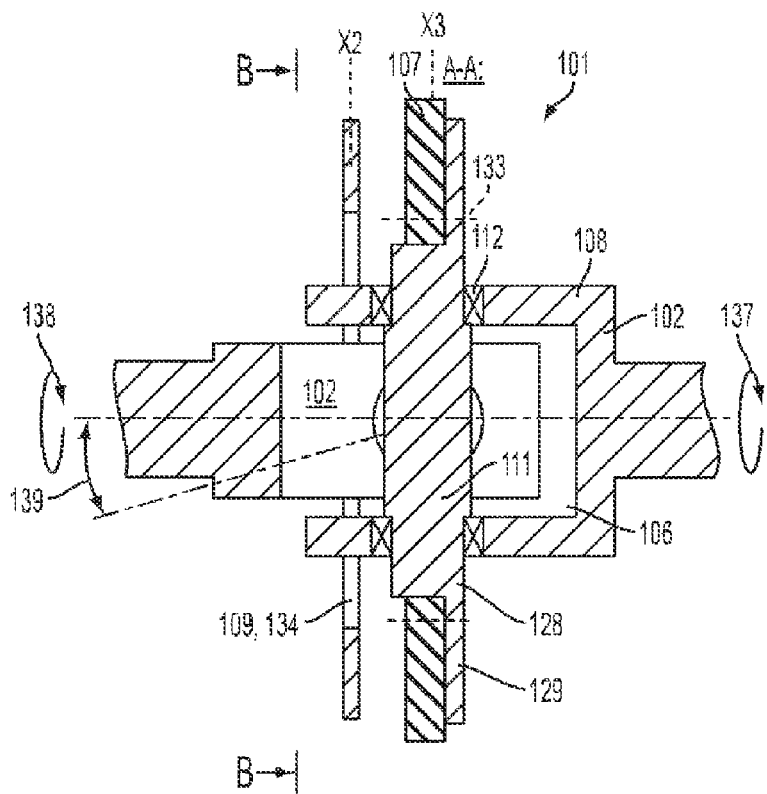
FIG. 4 shows a longitudinal section of a universal joint in a second embodiment.

In the exemplary embodiments shown according to the FIGS. 1 and 4, the respective shaft 3 or 4 is produced in one piece with the joint yoke 2. Of course, the joint yokes 2 may be connected with the respective shafts 3 or 4 also as separate components or supported thereon by means of suitable connection methods.

The bearings 12 in the yoke arms 8 are designed as single-row bearings with a axis of rotation that is radially oriented, for example, as anti-friction bearing, e.g., as needle or ball bearings, but they may also be designed as plain bearings. At least one of the two bearings 12 per joint yoke 2 is able to accept radial joint forces in addition to the axial joint forces. The bearings 12 are fixed in a suitable manner, radially relative to an axis of the joint, in the joint yokes 2 or their yoke arms 12. Possible embodiments are, for example, press fit, bonding or positive fit (abutting at the shoulder, spring ring or the like) of the outer races of the bearing in the joint yokes 2 or their joint arms 12.

Figure 2:
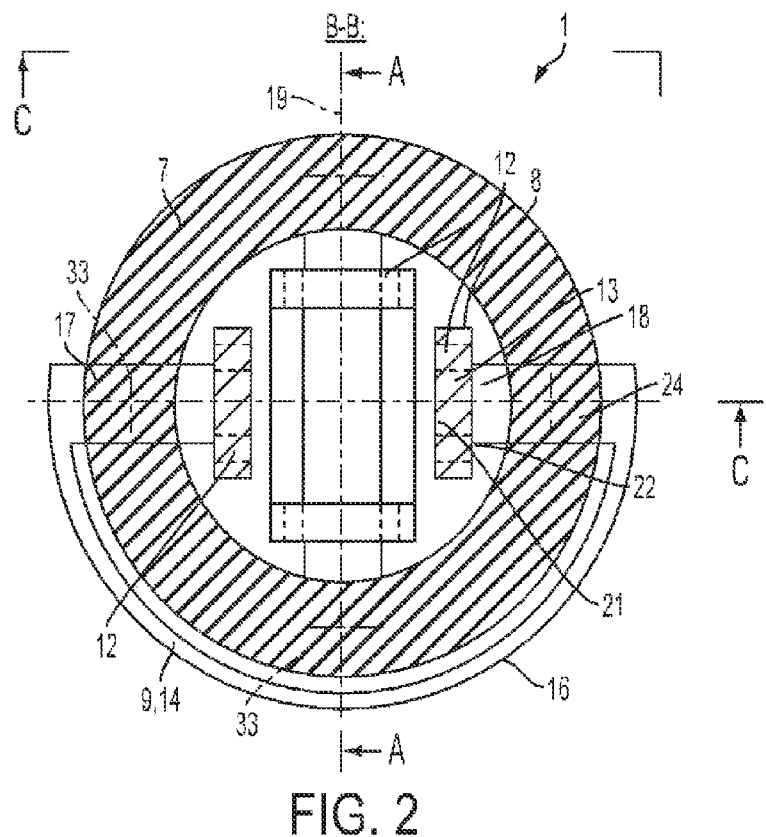
FIG. 2 shows a representation along a section A from FIG. 1.
Figure 3:
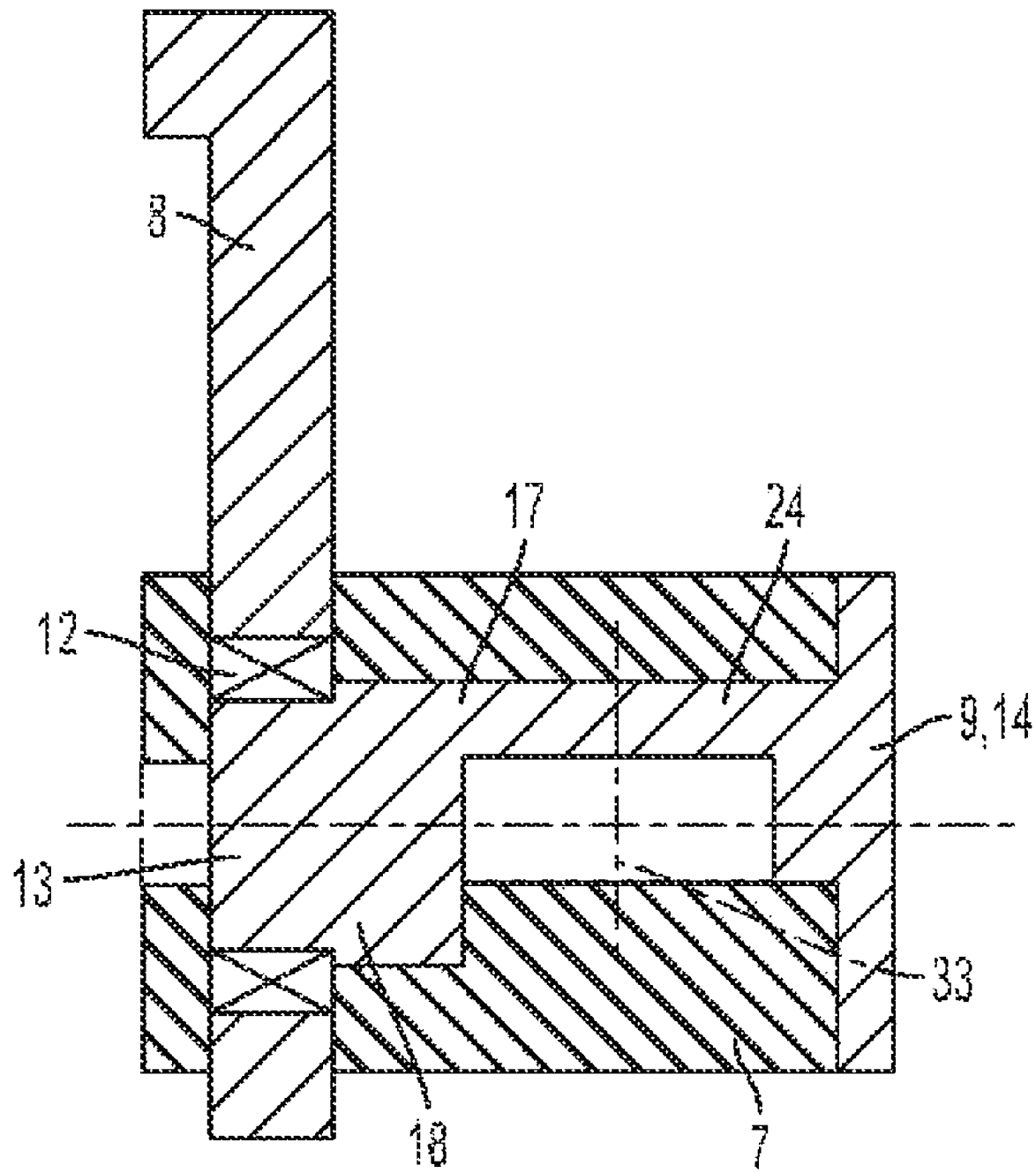
FIG. 3 shows a representation along a section C from FIG. 2.

In the exemplary embodiment shown in FIGS. 1, 2 and 3, the holding element 9 is formed as a ring clamp 14. The ring clamp 14 has a semi-circle-shaped basic semi-ring 16 and fastening areas 17 arranged at each side that merge into pin sections 18. The pin sections 18 each bear a pin 13.

The pins 13, in relation to a middle axis 19 of the joint, each reach counter-directionally into the associated yoke arms 8 or the bearings 12 placed therein. With their free ends 21, the pins 13 are oriented from an outer side 22 opposite the internal space 6 towards the internal space 6. The pin section 18 and thus, the pin 13, is arranged on the outside of the joint yokes 2 or their yoke arms 8 in relation to the axis of symmetry 19, the pin section 18 abutting a side of the bearings 12 pointing towards the outer side 22. Seen in the side view, therefore, the ring clamp 14 is slightly bigger than the joint yokes 2 in order to grasp them with its respective pin section 18 so that the pin 13 can reach into the bearings 12 from the outer side 22.

The respective fastening area 17 of the ring clamp 14 is shown in cross section in FIG. 3. This is formed L-shaped with the pin section 18 and a base web 24 arranged thereon.

Figure 5:
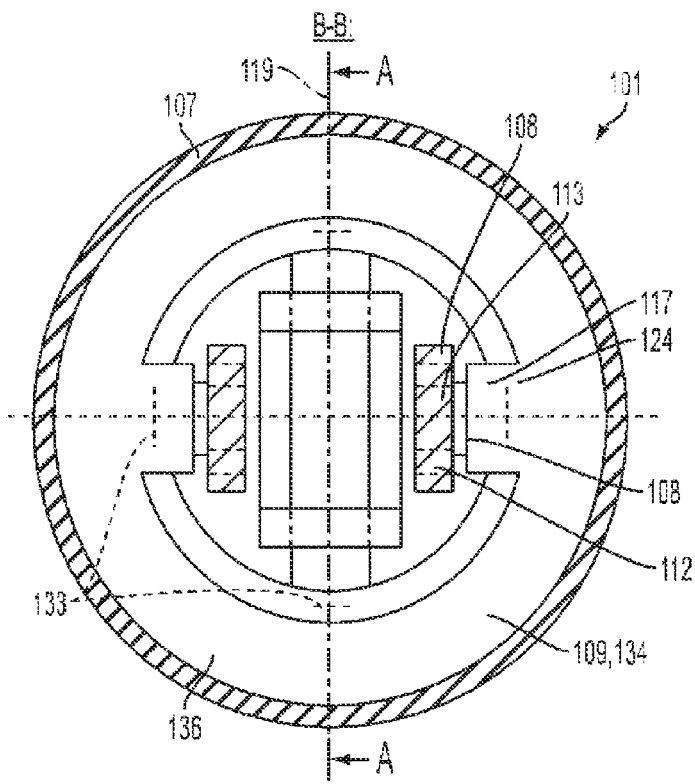
FIG. 5 shows a representation along a section A from FIG. 4.

The base web 24 extends in a perpendicular direction away from the middle axis 19 of the joint and radially towards the outside. The pin section 18 with its pin 11 is respectively arranged on the side oriented towards the outer side 22. The holding element 9 is spatially distanced in relation to the pin bearer 11. An axial clearance of the joint is provided by the existing radial interspace between the ring clamp 14 and the pin bearer 11. The ring clamp 14 can either be guided radially around the outside of the elastic coupling element 7, as shown in FIGS. 1, 2 and 3. An inside guidance of the ring clamp 14 between an elastic coupling element 7 that is designed bigger and the joint yokes 2 or directly around their yoke arms 8 is also conceivable. Alternatively, the ring clamp 14 could also have an axially offset guidance similar to what is shown in the FIGS. 4 and 5, but, in contrast to what is shown in FIGS. 4 and 5, with the supporting ring 34 as a semi-ring, which will be dealt more closely with below.

The pin bearer 11 is formed as a rotationally-symmetric body with a basic body 26 and with fastening areas 27 arranged, respectively, on the ends of the basic body 26. In the exemplary embodiment shown, the pin bearer 11 is made in one piece and, with its basic body 26, is disposed in the internal space 6.

In the longitudinal section in FIG. 1, the fastening areas 27 of the pin bearer 11 are shown like the fastening areas 17 of the holding element 9 or of the ring clamp 14, namely formed L-shaped with a transversal web 28 and a base web 29 arranged thereon.

Seen in a side view, the respective fastening area 27 is formed slightly more narrowly than the basic body 26, so that bearing shoulders 32 are formed in a transitional area 31.

With its respective fastening area 27, the pin bearer 11 penetrates the bearings 12 disposed in the associated joint yoke 2 or its yoke arms 8 from the internal space 6 towards the outer side 22. The bearing shoulders 32 abut a side of the bearing 12 oriented towards the internal space 6.

In the exemplary embodiment shown in FIGS. 1, 2 and 3, the elastic coupling element 7 is formed as an annulus (however, a multi-angular or polygonal ring would also be possible), preferably as a torsion-resistant, flexural elastic or axially elastic ring, and is connected with the fastening areas 17 of the holding element 9 or the ring clamp 14 and the fastening areas 27 or the base webs 29 of the pin bearer 11. The elastic coupling element 7, as shown in FIG. 2, is guided around the outer side 22 of the respective joint yoke 2 or its yoke arm 12, like the ring clamp 14.

The elastic coupling element 7 consists of a rubber, for example. A screw joint, rivet joint, vulcanization or the like may for example be provided as connection with the respective holding element 9 or 14. In the FIGS. 1 and 2, the connection is in principle represented by a chain-dotted line 33. Seen in a radial direction, the elastic coupling element 7 ends flush with the base web, but, seen in radial direction, may also protrude slightly over the base web 34, or may be formed slightly smaller, seen in radial direction.

A further embodiment of the universal joint 1 according to the invention is shown in FIGS. 4 and 5. As in the exemplary embodiment described in FIGS. 1, 2 and 3, the pins 113, in relation to a middle axis 119 of the joint, each reach counter-directionally into the bearings 112.

In this exemplary embodiment, the holding element 109 is formed as a supporting ring 134. The supporting ring 134 has a base ring 136 which, in contrast to the exemplary embodiment shown in FIGS. 1, 2 and 3, is formed as a full-circle ring and, as before, is guided around the outer sides 122 of the joint yokes 102 or their yoke arms 108, the supporting ring 134 also being associated with two fastening areas 117. As described before, the fastening areas 117 are formed L-shaped with the pin section 118 and the base web 124 arranged thereon. The pin sections 118 of the supporting ring 134 bear the pin 113 and, like the fastening areas 117, are arranged directly opposite from one another so that the pins 113 are oriented with their free ends 121 pointing towards each other. As described above with regard to FIG. 1, the pins 113 respectively reach into the associated bearings counter-directionally.

The pin bearer 111 is formed identically to the exemplary embodiment according to the FIGS. 1 and 2 as described above. The elastic coupling element 107 in radial direction protrudes slightly over the base web 129.

In comparison with the exemplary embodiment according to FIG. 1, the holding element 109 or the supporting ring 134 in FIG. 4, seen in longitudinal section or in a side view, is arranged with its middle axis offset in relation to the middle axis X3 of the pin bearer 111, the holding element 9 or the ring clamp 14 and the pin bearer 11 being congruent with their middle axes X2 or X3, according to the exemplary embodiment of FIG. 1. By means of a congruent arrangement of the middle axes X2 or X3, the axial constructional space required can be further minimized. Therefore, the supporting ring 134 in FIG. 4 could of course also be arranged with its middle axis X2 congruently in relation to the middle axis X3 of the pin bearer 111, but of course it can also be provided that the ring clamp 14 in FIG. 1 is arranged with its middle axis X being radially offset in relation to the middle axis X1 of the pin bearer 11, the axially offset arrangement offering the advantage of a minimized radial constructional space. The design as a semi-circle shaped holding element 9, as designed as ring clamp 14 in the FIGS. 1, 2 and 3, offers the advantage of a simple radial maintenance (exchanging of the holding element 9) without dismantling the joint or separating the joint 1 from the shafts 3 or 4. This advantage can be used also in the case of a possible design of the axially offset supporting ring 34 not, as shown in FIGS. 4 and 5, as a full ring, but as a semi-circle shaped, axially offset holding element 9.

In other regards, the embodiment according to the FIGS. 4 and 5 corresponds to the embodiment according to FIGS. 1, 2 and 3.

In the universal joint 1, 111 according to the exemplary embodiments, illustrated in FIGS. 1 to 5, as described hereinafter with respect to the embodiment of FIGS. 1-3 but similarly applicable to FIGS. 4 and 5, an input moment (direction of rotation 37) is transmitted via the driven shaft 3 (drive shaft) via the joint yoke 2 onto the pin bearer 11 pivoted therein and thence, as tensile/compression stress, onto the elastic coupling means 7 to the holding element 9, 14, 34 pivoted in the joint yoke 2 and then on to the joint yoke 2 of the shaft 4 to be driven or drive shaft. This is represented by means of the output moment (direction of rotation 38) that is equidirectional with the input moment (direction of rotation 37). Of course, the connections of the input moment 37 or output moment 38 may be reversed.

With regard to the bending stiffness required to a small degree, the elastic coupling element 7 is selected such that it is ensured that a rotation of the holding element 9, 14, 34 with its pin 13 or of the pin bearer 11 can take place during an inclination (inclination 39) and rotation 37, 38 of the joint yoke 2 in order to overcome the friction torque according to the selected bearing clearance in the bearings 12. In axial direction, the elastic coupling element 7 thus permits a compliance that can be used for insulation, while the contour of the elastic coupling element 7 provides a high torsional stiffness.

If the ring clamp 14 is used as a holding element 9 (as illustrated in the FIGS. 1, 2 and 3), the bending stiffness of the elastic coupling element 7 must additionally be selected sufficiently high in order to hold the ring clamp deviating from the vertical direction in accordance with the assembly position of the joint.

Advantageously, the universal joint 1, 111 can be formed smaller in the case of an embodiment according to FIGS. 1 to 5, with an elastic coupling element 7, 107 formed as a ring, so that an axial flexibility can be increased at the same rotational stiffness.

The universal joint 1, 111 shown in FIGS. 1 to 5 is particularly suitable for use in a steering column of a motor vehicle. The shafts 3 and 4 are shown oriented in alignment with each other. In the vehicle, there usually is a angled position, relative to each other, with the universal joint maintaining the transmission of the rotation. The angled position is shown in FIGS. 1 and 4 by means of the angle of inclination (inclination) 39, 139.

What is claimed is:

1. A universal joint for coupling a drive shaft and a driven shaft, comprising:
   a first joint yoke in communication with one of the drive shaft and the driven shaft and comprising opposing yoke arms having apertures through which a pin bearer is pivotally coupled;
   a second joint yoke in communication with the other of the drive shaft and the driven shaft and comprising opposing yoke arms having apertures through which portions of a holding element extend from an outer side of each yoke arm toward an inner side of each yoke arm to pivotally connect the holding element to the yoke arms; and a coupling element comprising an elastic material and having an annular shape, the coupling element engaging the pin bearer at diametrically opposed locations along the coupling element and engaging the holding element at different diametrically opposed locations along the coupling element.

2. The universal joint of claim 1, wherein the pin bearer comprises a rotationally-symmetric body.

3. The universal joint of claim 1, wherein the pin bearer comprises a basic body and an adjacent L-shaped fastening area including a transversal web and a base web, the transversal web extending through the yoke arm apertures in a direction oriented from an inner side of each yoke arm toward an outer side of each yoke arm.

4. The universal joint of claim 1, wherein the pin bearer comprises a recess for accommodating the coupling element.

5. The universal joint of claim 1, wherein the holding element is guided around an outer side of the associated joint yoke.

6. The universal joint of claim 1, wherein the holding element has a fastening area comprising an L-shaped cross section including a pin section and a base web.

7. The universal joint of claim 1, wherein the holding element comprises a ring clamp.

8. The universal joint of claim 1, wherein the holding element comprises a recess for accommodating the coupling element.

9. The universal joint of claim 1, wherein the holding element has a semi-annular shape.

10. The universal joint of claim 9, wherein the holding element is concentric with the coupling element.

11. The universal joint of claim 10, wherein the holding element is located radially outwardly from the coupling element.

12. The universal joint of claim 1, wherein the coupling element comprises rubber.

* * * * *